United States Patent [19]
Holt et al.

[11] Patent Number: 6,062,815
[45] Date of Patent: May 16, 2000

[54] UNITIZED SEAL IMPELLER THRUST SYSTEM

[75] Inventors: Robert S. Holt, Sanbornton; John C. Dahlheimer, Laconia, both of N.H.

[73] Assignee: Freudenberg-NOK General Partnership, Plymouth, Mich.

[21] Appl. No.: 09/092,714

[22] Filed: Jun. 5, 1998

[51] Int. Cl.$^7$ ............................ F04D 29/10; F04D 29/08; F16J 15/00

[52] U.S. Cl. ........................ 415/231; 415/111; 415/113; 415/170.1; 415/174.3; 415/230; 277/367; 277/361

[58] Field of Search ..................................... 415/111, 113, 415/170.1, 174.3, 230, 231; 277/367, 361

[56] References Cited

U.S. PATENT DOCUMENTS

| | | |
|---|---|---|
| 3,904,211 | 9/1975 | Dega . |
| 4,380,416 | 4/1983 | Menager .............................. 415/170 A |
| 4,451,049 | 5/1984 | Charhut ...................................... 277/42 |
| 4,557,672 | 12/1985 | Levine ..................................... 417/360 |
| 4,754,981 | 7/1988 | Burns . |
| 4,768,923 | 9/1988 | Baker . |
| 5,209,499 | 5/1993 | Ruff, Jr. et al. . |
| 5,421,592 | 6/1995 | Petrak . |
| 5,558,491 | 9/1996 | Andrews . |

*Primary Examiner*—Edward K. Look
*Assistant Examiner*—Rhonda Barton
*Attorney, Agent, or Firm*—Dinnin & Dunn, P.C.

[57] ABSTRACT

A unitized seal impeller thrust system includes an impeller unit which includes a tubular neck portion that has flat surfaces on opposite sides of one another. The impeller unit includes a plurality of radially extending blades and a circular trough surrounding the neck portion. The system further includes a seal head assembly which is secured within the trough, and a seal seat assembly which engages the seal head assembly. The system further includes a thrust washer which engages the seal seat assembly and the retainer ring which is secured to the tubular neck portion at an end of the neck portion. The retainer ring also engages the thrust washer in a ball and socket type arrangement. The system provides a unitized seal, impeller, thrust system that is capable of preload testing and/or leak testing before assembly of the pump unit.

30 Claims, 5 Drawing Sheets

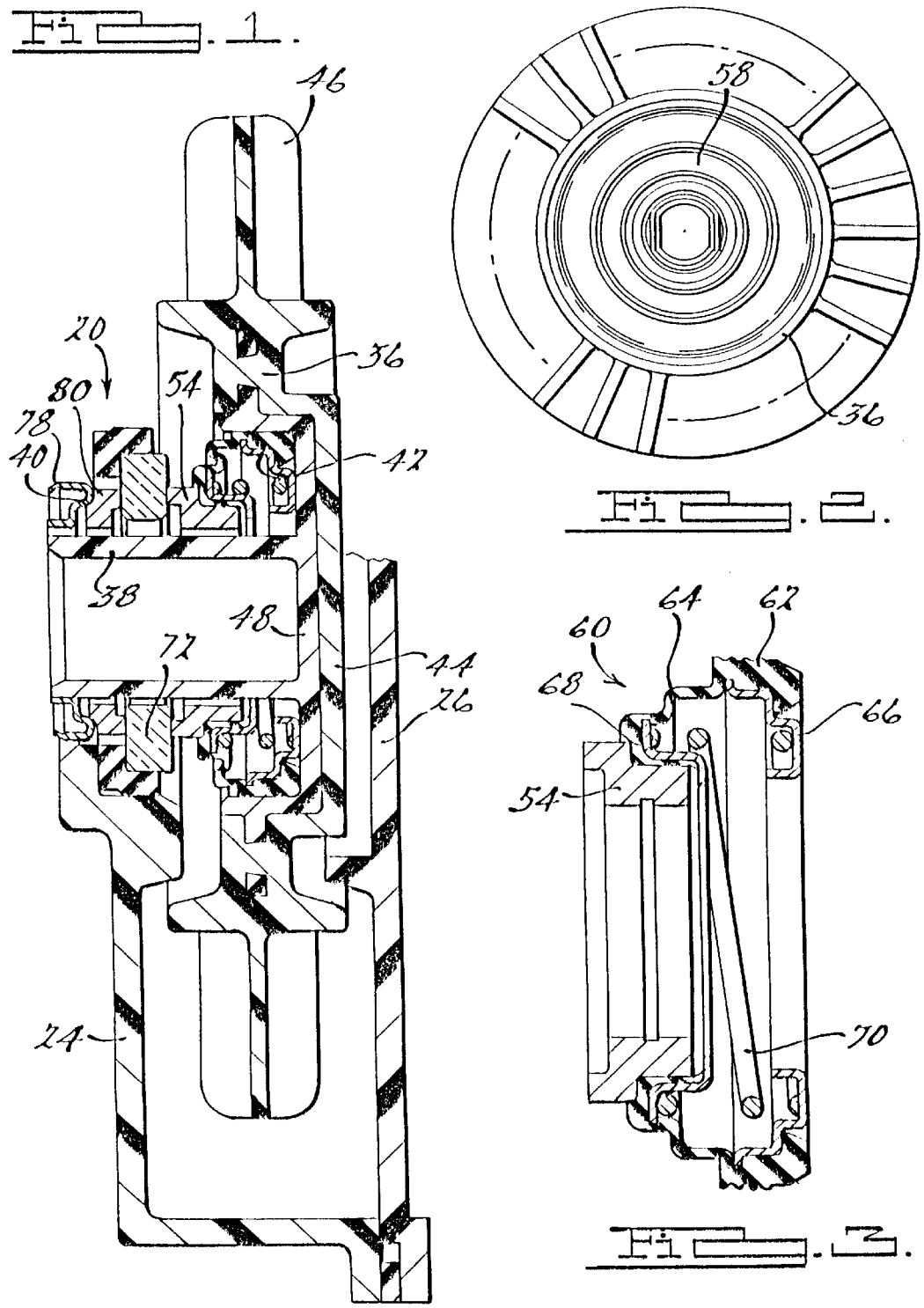

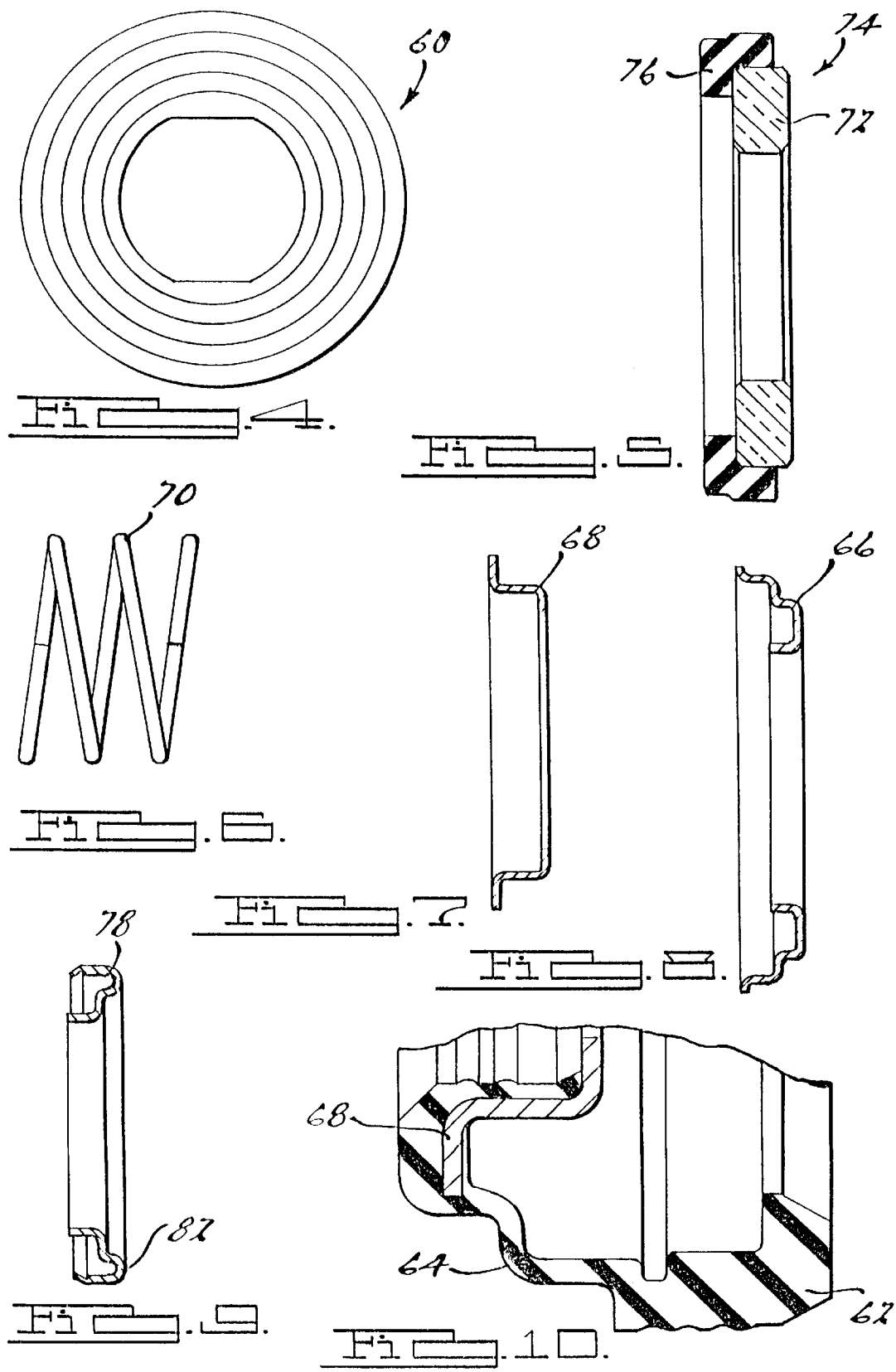

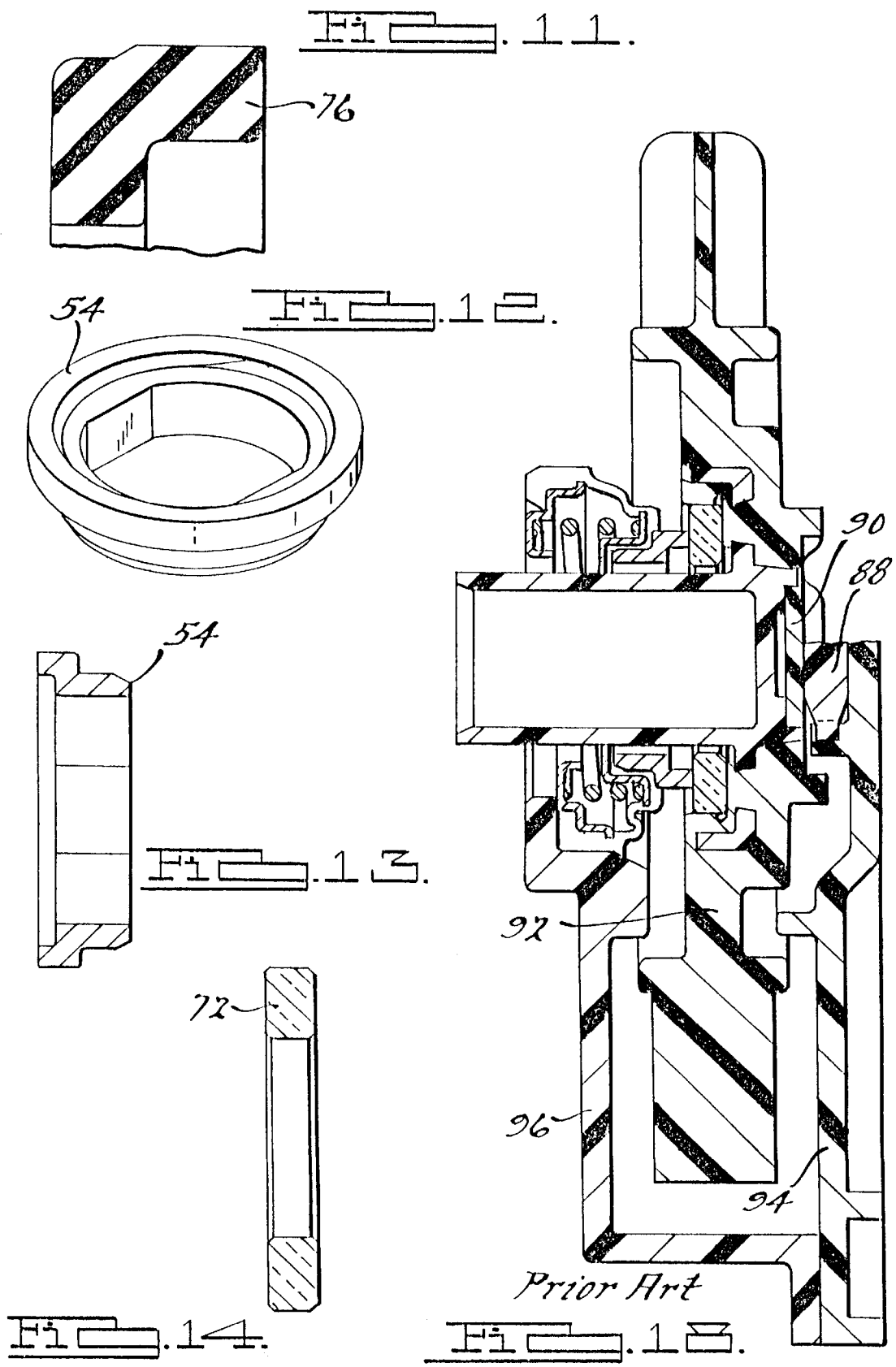

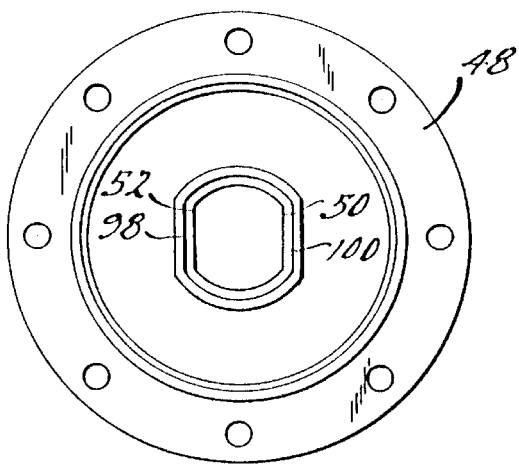
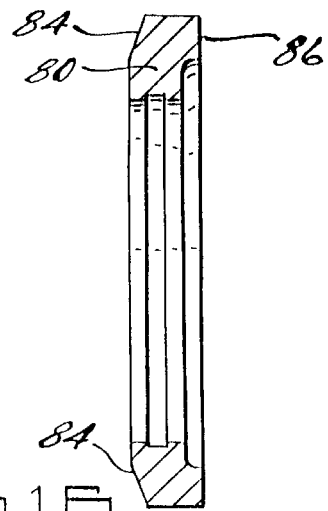
Fig. 15.    Fig. 16.
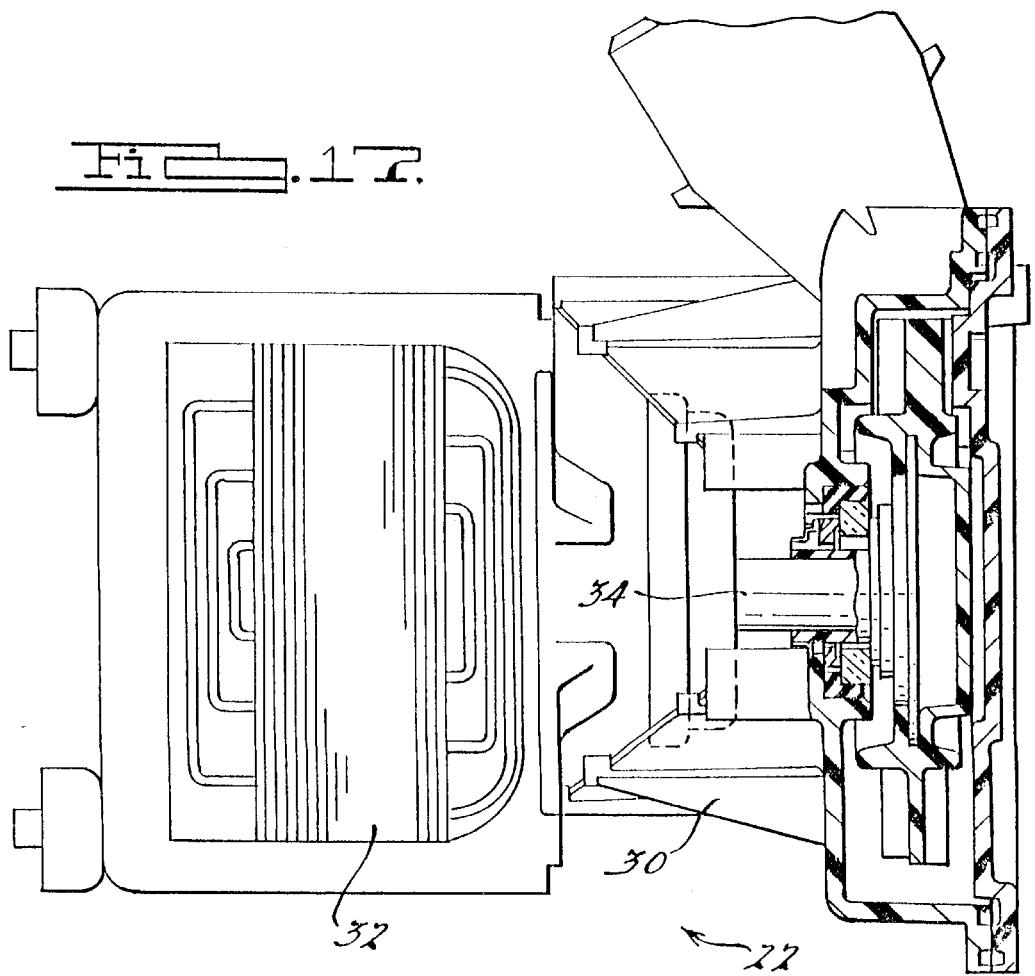
Fig. 17.

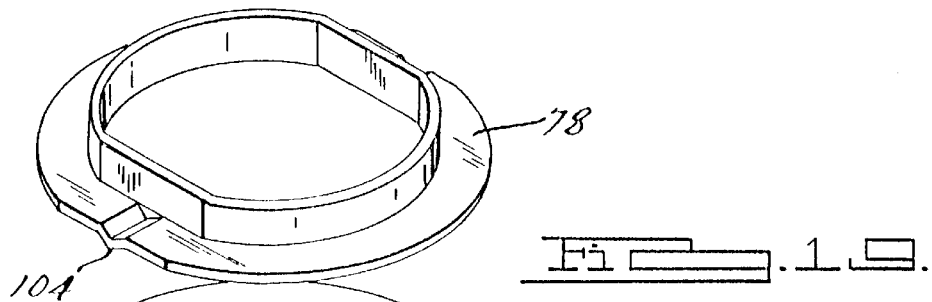
Fig. 19.
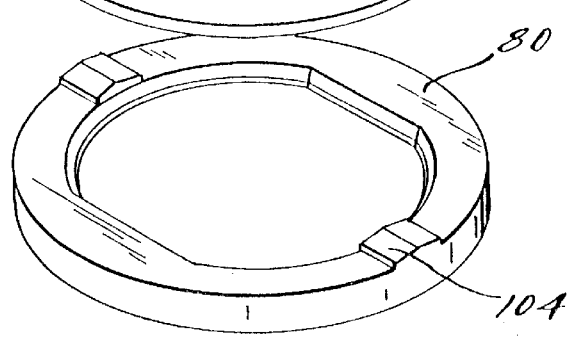
Fig. 20.
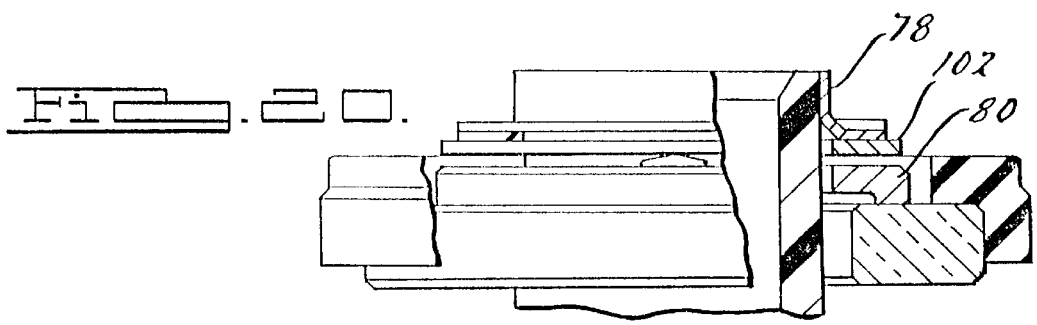
Fig. 21.
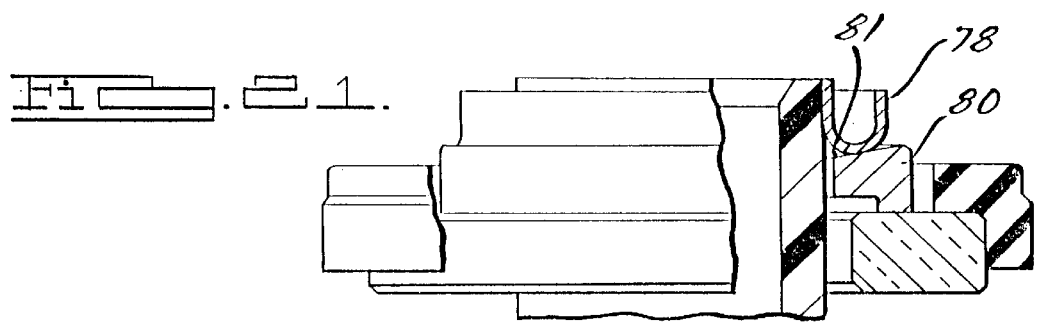

UNITIZED SEAL IMPELLER THRUST SYSTEM

BACKGROUND OF THE INVENTION

1. Field of the Invention

The present invention relates to pumps, and more particularly to a unitized seal, impeller, thrust system for use in a pump.

2. Description of Related Art

Many of the appliances used in everyday homes such as dishwashers and laundry machines include water pumps that have a mechanical face seal assembly which consists of a seal head and seal seat portion, a pump impeller and a thrust bearing system. Each of these systems are used to provide the sealing, pumping and axial force absorbing functions of the water pump, respectfully. Each of the systems are tested, handled and installed as individual components or sub-assembly units during construction of the actual water pump.

Many prior art pumps have used some pre-assembly of the above mentioned components such as sealing the seal seat portion of the mechanical face seal assembly and a thrust disc of the thrust bearing system into the pump impeller so that unitized components may be handled and installed into a single unit. However, components such as the thrust button of the thrust bearing system and the seal head of the mechanical face seal assembly must still be handled and installed as separate entities into other components of the pump such as the pump cover or the pump housing. This installation leaves the precision bearings and the sealing components exposed to damage or contamination until the entire pump is assembled. This type of construction for the pumps also precludes any leakage testing of the entire mechanical face seal assembly until after assembling and welding the entire pump closed because the proper mating of the seal head and seal seat portions is only achieved after completing the pump assembly. Hence, if the mechanical face seal assembly is found to have a leak after pump assembly has occurred, because of damage or contamination of seal components, salvaging of these pump components is not possible without destroying the pump housing and pump cover which have been welded or secured together. Another problem with the current pumps is that the thrust bearing is immersed in the liquid being pumped which exposes the bearing to chemical attack and/or abrasive wear which contributes to premature thrust bearing system wear and failure. This catastrophic pump failure occurs because the pump impeller then runs directly against the plastic cover of the pump, creating frictional heat high enough to melt through the cover allowing the fluid being pumped to leak out of the pump into surrounding areas.

Therefore, there is a need in the art for a new combination of a mechanical face seal assembly, a pump impeller and a thrust bearing system that is a unitized unit such that the entire assembly may be leak tested prior to installation and handled and installed as a single unit. Furthermore, there is a need for a thrust bearing system which is not immersed in and which is sealed off from the fluid being pumped within the pump chamber.

SUMMARY OF THE INVENTION

One object of the present invention is to provide a one piece seal, impeller, thrust bearing system for use in a pump.

Another object of the present invention is to provide a unitized seal, impeller, thrust construction which will protect precision bearing and sealing components and surfaces from damage or contamination.

Yet another object of the present invention is to allow for pre-testing of the mechanical face seal assembly for leakage prior to installation into the pump.

Another object of the present invention is to remove the thrust bearing system from immersion in the liquid being pumped where that system is subject to chemical attack and/or abrasive wear which in turn will extend pump life and reduce catastrophic pump failures.

Another object of the present invention is to provide a more robust construction for use in a pump.

A further object of the present invention is to eliminate the need for a special pocket in the pump cover to accommodate a portion of the thrust bearing system.

Another object of the present invention is to eliminate any axial thrust force of the mechanical face seal from acting against the pump cover through a thrust bearing system which is supported by the pump cover.

To achieve the foregoing objects the unitized seal, impeller and thrust system includes an impeller unit, wherein that unit includes a tubular neck portion. The neck portion has flat surfaces opposite one another and the unit also includes a plurality of radially extending blades. The unit further includes a circular trough surrounding the neck portion. The system includes a seal head assembly secured within the trough, and a seal seat assembly engaging the seal head assembly. The system further includes a thrust washer engaging the seal seat assembly and a retainer ring which is secured to the neck portion and an end of the neck portion. The retainer ring engages the thrust washer.

One advantage of the present invention is that it provides a one piece seal impeller, thrust bearing system for use in a pump.

A further advantage of the present invention is that the unitized construction protects the precision bearing and sealing components and surfaces from damage or contamination.

Another advantage of the present invention is that it allows for pre-testing of the mechanical face seal assembly for leakage prior to installation in the pump.

Another advantage of the present invention is that it removes the thrust bearing system from immersion in the liquid being pumped.

Yet another advantage of the present invention is that it provides a more robust construction for the pump assembly.

A further advantage of the present invention is that it eliminates the thrust bearing system from the wetted interior surfaces of the pump thus eliminating snag points and also eliminates a need for a special pocket in the pump cover.

Yet another advantage of the present invention is the elimination of the axial thrust force in the mechanical face seal from acting against the pump cover through a thrust bearing system supported by the pump cover.

Other objects, features and advantages of the present invention will become apparent from the subsequent description and appended claims, taken in conjunction with the accompanying drawings.

BRIEF DESCRIPTION OF THE DRAWINGS

FIG. 1 shows a cross-sectional view of the present invention.

FIG. 2 shows an end view of the impeller unit.

FIG. 3 shows a cross section of the seal head assembly.

FIG. 4 shows an end view of the seal head assembly.

FIG. 5 shows a cross section of the seal seat assembly.

FIG. 6 shows a side view of the spring.

FIG. 7 shows a cross section of the insert.

FIG. 8 shows a cross section of the spring seat.

FIG. 9 shows a cross section of the retainer ring.

FIG. 10 shows a cross section of the boot with the insert molded in place.

FIG. 11 shows a cross section of the grommet.

FIG. 12 shows a top view of the seal washer.

FIG. 13 shows a cross section of the seal washer.

FIG. 14 shows a cross section of the seal seat.

FIG. 15 shows a top view of the impeller insert.

FIG. 16 shows a cross section of the thrust washer.

FIG. 17 shows a pump assembly including the present invention.

FIG. 18 shows a prior art pump.

FIG. 19 shows an alternate embodiment exploded plan view of the retainer ring, gimbal ring and thrust washer.

FIG. 20 shows a partially cut away side view of the alternate embodiment gimballed thrust system.

FIG. 21 shows a partially cut away side view of an alternate embodiment of the unitized seal, impeller and thrust system.

BEST MODE OF CARRYING OUT THE INVENTION AND DESCRIPTION OF THE PREFERRED EMBODIMENT(S)

Referring to the drawings, a unitized seal, impeller, thrust system 20 for use in a pump unit 22 is shown. FIG. 1 shows the unitized seal, impeller, thrust system 20 according to the present invention. The pump unit 22 includes a pump housing 24 which generally has a U-shaped cross section and a pump cover 26 which is preferably welded however, it can be secured by any other appropriate means to the pump housing 24 to form a pump chamber in which the unitized seal. impeller, thrust system 20 operates. As shown in FIG. 17, the pump unit is then connected via legs 30, on the pump unit, to a motor 32 to form a complete pump assembly. In the preferred embodiment, the motor 32 is an electric motor but any other type of motor may be used. The motor 32 includes a motor shaft 34 which engages with flat surfaces found inside the impeller neck portion 38. The motor 32 allows for rotational forces to be provided to the impeller 36 such that a pumping of a liquid may occur for appliances such as laundry machines, dishwashers and the like.

The unitized seal, impeller, thrust system 20 consists of a unique arrangement and combination of a mechanical face seal assembly 42, an impeller unit 44, and a thrust bearing system 40. These three systems are unitized together such that the entire assembly can be leak tested prior to installation and handled and installed as a single unit. This unitized construction will also protect the precision bearing and sealing components from damage and contamination prior to and during installation into the pump unit 22. The unitized system also provides for a thrust bearing system 40 which is not immersed in and which is sealed off from the fluid being pumped through the pump unit 22 and the appliance through which the pump circulates fluid.

The unitized seal, impeller, thrust system 20 includes an impeller unit 44 which includes an impeller 36 which has a plurality of blade members 46 extending radially in an outward direction. The impeller blade 46 rotates within a fluid area of the pump unit 22. The impeller blades 46 create the necessary forces to move the liquid being pumped through the pump system and throughout the appliance. In the preferred embodiment, the impeller unit 44 includes the impeller 36 which is preferably made of an elastomeric material however, it should be noted that any other resilient semirigid or ceramic material or plastic material may be used for the impeller. The impeller 36 also includes a rigid plastic impeller insert 48 however any other type of rigid material may be used depending on the needs of the pump environment. The impeller 36 is molded around the impeller insert 48 such that it becomes a unitized piece within the pump unit 22. The impeller insert 48 also includes a tubular neck portion 38 which creates a cylindrical cavity in FIG. 15 shows the impeller insert 48. The tubular neck portion 38 also includes a first flat surface 50 and a second flat surface 52 which are located opposite of each other or 180° from each other such that the flats mimic one another and are capable of slidingly engaging and securing corresponding flats on a motor shaft 34. The flat surfaces (50, 52) are located on the inner surface on the tubular neck portion 38 and flat surfaces (98, 100) are located on the outer surface of the tubular neck portion 38.

In an alternate embodiment the impeller insert 48 and impeller 36 are one piece made of a plastic material. The impeller 36 generally has a circular shape with the impeller blades 46 either staggered or across from one another on the outer periphery of the impeller 36. The tubular neck 38 of the impeller insert 48 creates a double D appearance from a top view as shown in FIG. 15. This is created when both the inner and outer surfaces of the impeller insert 48 have flat surfaces which are parallel to one another or on opposite sides of the tubular neck portion 38. The flats which are molded on the tubular neck portion 38 provide positive rotational drive of the impeller 36 by engaging the corresponding flats on the motor drive shaft 34. The flats molded on the exterior surface of the tubular neck portion 38 provide positive rotational drive to the seal washer 54 of the seal head assembly by engaging corresponding flat surfaces on the interior surface of the seal washer 54. The flats on the outer surface also engage corresponding flats on the interior surface on the thrust washer 80. In the preferred embodiment the rigid impeller insert 48 also includes an outer radiating flange that has a plurality of orifices placed around its outer circumference that are used to lock an elastomeric impeller 36 axially and provide positive rotational drive between the impeller insert 48 and the impeller 36. The impeller insert 48 also includes a circular trough 58 adjacent to the tubular neck portion 38.

The unitized seal, impeller, thrust system 20 includes a mechanical face seal assembly 42 which further includes a seal head assembly 60 as shown in FIG. 3. The seal head assembly 60 includes a boot member 62 preferably made of a NBR (nitrile rubber) material however, it should be noted that any other type of rubber or elastomeric material may be used. The boot member 62 includes a thin walled flexible bellows portion 64. The seal head assembly 60 also includes a spring seat 66 which engages and is secured to the boot member 62. The spring seat 66 is preferably made of an aluminum, however any other metal, plastic or rigid material may be used. On the opposite end of the boot member 62 is located an insert member 68 which is preferably made of a steel material however any other metal material may be used depending on the needs. The insert member 68 is molded to the top portion of the boot member 62. The seal head assembly 60 also includes a helically coiled wire compression spring 70, made of a metal material. However, it should be noted that any other material capable of having spring-like characteristics may be used and that any other type of spring such as a wavy washer spring may be used. The spring 70 extends between the insert member 68 and the spring seat 66 within the boot member 60. A seal washer 54 which is preferably made of a carbon or graphite filled thermoset plastic, however any other suitable anti-frictional material may be used for the seal washer, is secured within a circular orifice of the boot member 62. The spring 70 urges the seal washer 54 into constant contact with a seal seat 72. The seal washer 54 is circular in shape and includes a first and second flat surface on its interior surface wall such that it mates and slidingly engages with the corresponding flats on the tubular neck portion 38 of the impeller 36. The seal head assembly 60 is secured and located within the circular trough 58 of the impeller insert 48.

The mechanical face seal assembly also includes a seal seat assembly 74. The seal seat assembly 74 is in constant contact with the seal head assembly 60. The seal seat assembly 74 includes a generally circular seal seat 72 which is preferably made of a ceramic material. However, it should be noted that any type of wear resistant material such as metal or plastic may be used. The seal seat 72 is secured within a circular grommet member 76, the grommet member is preferably made of a NBR rubber material however it should be noted that any other rubber or elastomeric material may be used. The grommet 76 generally has an L-shaped cross section which forms a circular seat portion into which the seal seat 72 is secured and placed. The seal seat 72 is aligned opposite of the seal head assembly 60 such that the front of seal seat 72 is in constant sealing contact with the seal washer 54 of the seal head assembly 60. The spring 70 of the seal head assembly 60 creates the necessary forces to insure constant contact between the seal seat 72 and the seal washer 54 in the mechanical face seal assembly and to resist the effects of hydraulic pressures in the pump acting on the seal head assembly 60 and the impeller unit 44.

The thrust bearing 40 system includes a retainer ring 78 and thrust washer 80. The retainer ring 78 axially locates the thrust washer 80, the mechanical face seal assembly 42 and the impeller 36 with respect to one another independent of the axial distance between the pump housing 24 and the pump cover 26. The retainer ring 78 also serves to unitize the components into a single assembly by press fitting about the tubular neck portion 38 of the impeller 36.

The retainer ring 78 also includes an axially protruding torus portion 82 which provides a circumferential contact with a convex, angular, beveled, or concaved corner 84 which is located on a rear portion of the thrust washer 80. The combination of the convex corner 84 and the protruding torus portion 82 allow the thrust washer 80 and retainer ring 78 to work together as a ball and socket which will accommodate angular positioning or movement resulting from angular misalignment of the motor drive shaft 34 and/or impeller unit 44 with the pump housing bore, in which the seal seat portion of the mechanical face seal assembly is mounted.

In the preferred embodiment the thrust washer 80 is made of a low friction material such as a graphite-filled thermoset plastic material such as phenolic, however, it should be noted that any other low friction material may be used such as impregnated powdered metal or sintered carbon depending on the needs of the pump assembly. The thrust washer 80 also rotates with the impeller 36 and transmits any axial thrust reaction of the spring 70 and deflected elastomeric bellows 64 of the seal head assembly 60. The thrust washer 80 is also engaged with the seal seat assembly 74 and any reaction force is transmitted by the thrust washer 80 against the rear surface of the seal seat 72. The side of the thrust washer 80 in contact with the rear surface of the seal seat 72 includes a projecting nose portion 86 which terminates in a flat annular bearing surface which is narrower than and radially centered on the exposed annular flat bearing surface on the rear of the seal seat 72. This will allow the thrust washer 80 to rotate on an axis which is offset from the axis of the stationary seal seat 72 without the nose portion 86 leaving the bearing surface on the rear of the seal seat 72. This will accommodate any offset or eccentric alignment of the motor drive shaft 34 on which the impeller 36 and thrust washer 80 is mounted and the pump housing bore in which the seal seat assembly 70 of the mechanical face seal assembly is mounted. The outer surface of the retainer ring 78 is secured to the end of the tubular neck portion 38 such that it forms a parallel interface.

In an alternate embodiment, the thrust washer 80 includes a convex or beveled recessed 81 on the outer surface of the thrust washer 80. The recess 81 engages with a torus that protrudes from the retainer ring 78. This alternate embodiment is preferably used when the axis of the seal seat bore and the axis of the motor shaft 34 and/or impeller 44 converges closest together on the retainer ring 78 side of the unitized seal, impeller, thrust system 20. The preferred embodiment is used when the axis of the seal seat bore and the axis of the motor shaft 34 and/or impeller 44 converges closest together on the impeller side end of the unitized seal, impeller thrust system 20.

Yet another alternate embodiment FIGS. 19 and 20, of the invention includes using a gimbal ring 102 located between the retainer ring 78 and the thrust washer 80 to provide a pivoting response to angular positioning and movement. The gimbal ring 102 has a generally flat washer shape. The gimbal ring 102 contacts two 90° offset pair of gimbal pads 104 which are formed integral to adjacent components. This arrangement will insure that the crossing pivotal axes of the two gimbal planes are separated a distance equal to the stock thickness of the gimbal ring 102. The gimbal ring 102 may also be offset but substantially flat which will assure that the crossing pivotal axes intersect one another. The gimbal ring embodiment is well suited for severe applications because it will transfer mechanical seal preload symmetrically to the thrust washer 80 which bears and presses against the rear bearing surface of the seal seat 72 to prevent any axial movement of the impeller 44 off of the motor shaft 34.

FIG. 18 shows a prior art pump assembly wherein a thrust disk 88 and thrust button 90 are all exposed to the fluid being pumped with the pump assembly. Being immersed in the liquid being pumped exposes the bearing to chemical attack via chlorine and/or other household chemicals and/or abrasive wear from things such as sand, calcium deposits, etc. which contribute to premature wearout of the thrust bearing system. This in turn causes catastrophic pump failure because the pump impeller 92 has a possibility of running directly against the plastic cover 94 of the pump creating frictional heat which is hot enough to melt through the cover 94. This will then allow the fluid being pumped to leak out of the pump. This construction also precludes leakage testing of the mechanical face seal assembly until after the pump is welded shut. Any leakage that is found, after the pump is assembled, due to damage or contamination of the seal components prevents any salvaging of the pump components or subassemblies because salvaging is no longer possible without destroying the pump housing 96 and pump cover 94 which have already been welded or assembled together.

While the foregoing has been described in conjunction with appliances, those skilled in the art will recognize that the invention can be applied to other applications such as but not limited to automotive, industrial, agricultural and construction equipment which may be driven by an internal combustion engine or hydraulic motor.

Although the present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. An unitized seal, impeller and thrust system, said system including:
   an impeller unit, said unit includes a tubular neck portion, said unit includes a plurality of radially extending blades, said unit having a circular trough surrounding said neck portion;
   a seal head assembly secured within said trough;
   a seal seat assembly engaging said seal head assembly;
   a thrust washer engaging said seal seat assembly; and
   a retainer ring which is secured to said neck portion at an end of said neck portion, said retainer ring engages said thrust washer, said retainer ring axially locates said thrust washer, said seal seat assembly, said seal head assembly and said impeller with respect to one another.

2. The unitized system of claim 1 wherein said retainer ring includes a protruding torus which interacts with a corner on a rear surface of said thrust washer.

3. The unitized system of claim 2 wherein said torus and said corner accommodates angular movement.

4. The unitized system of claim 2 wherein said torus and said corner create a ball and socket type joint.

5. The unitized system of claim 1 wherein said retainer ring includes a protruding torus which interacts with a recess on an outer surface of said thrust washer.

6. The unitized system of claim 1 further including a gimbal ring located between said retainer ring and said thrust washer.

7. The unitized system of claim 6 wherein said gimbal ring contacts two 90° offset pair of gimbal pads.

8. The unitized system of claim 1 wherein said seal head assembly includes a boot member having bellows, an insert member molded within said boot, a spring seat secured to said boot, a seal washer engaged with said boot, and a spring extended between said insert and said spring seat.

9. The unitized system of claim 1 wherein said seal seat assembly includes a ring-like grommet, said grommet having a generally L-shaped cross section, a seal seat secured within said grommet, said seal seat in constant contact with said seal washer.

10. The unitized system of claim 1 wherein said neck portion having at least one flat surface.

11. The unitized system of claim 10 wherein said at least one flat surface engages said seal head assembly.

12. The unitized system of claim 1 wherein said thrust washer absorbs an axial preload thrust of said seal head assembly.

13. The unitized system of claim 1 wherein said thrust washer and said retainer ring are sealed off from a liquid being pumped through a pump.

14. A pump assembly using a unitized seal, impeller, and thrust system, said assembly including:
   a pump housing;
   a pump cover secured to said pump housing;
   a unitized seal, impeller, thrust system secured within said pump housing, said impeller unit having a tubular neck portion, said tubular neck portion having a first and second flat surface, said first and second flat surfaces are opposite each other, said unitization of said seal, impeller and thrust system allows for preload testing or leak testing before assembly of said pump; and
   a motor, said motor having a drive shaft with a first and second flat surface, said motor shaft slidingly engages with said flat surfaces of said impeller unit.

15. The pump assembly of claim 14 wherein said impeller unit includes an impeller integral with an impeller insert, said impeller insert having said tubular neck portion.

16. The pump assembly of claim 14 wherein said unitized system includes a seal head assembly and a seal seat assembly.

17. The pump assembly of claim 16 wherein said seal head assembly is located in a circular trough of said impeller unit.

18. The pump assembly of claim 16 wherein said unitized system includes a thrust washer engaging said seal seat assembly and a retainer ring secured to a top end of said tubular neck portion, said retainer ring engaging said thrust washer.

19. The pump assembly of claim 18 wherein said retainer ring and said thrust washer axially locate said seal seat assembly, said seal head assembly and said impeller unit with respect to one another.

20. The pump assembly of claim 19 wherein location of said seal and of said impeller unit with respect to said pump housing is independent of an axial distance between said pump housing and said pump cover.

21. The pump assembly of claim 18 wherein said thrust washer includes an angular beveled corner on a rear surface and said retainer ring includes a protruding torus.

22. The pump assembly of claim 21 wherein said torus and said corner accommodate angular movement.

23. The pump assembly of claim 21 wherein said thrust washer and said retainer ring are sealed off from a fluid being pumped by said pump.

24. The pump assembly of claim 18 wherein said retainer ring and said neck portion align and secure said seal, impeller and thrust system as a unitized system.

25. The pump assembly of claim 14 wherein said impeller unit includes an impeller and an impeller insert which is secured to said impeller.

26. A pump assembly using a unitized seal, impeller, and thrust system, said assembly including:
   a pump housing;
   a pump cover secured to said pump housing;
   a unitized seal, impeller, thrust system secured within said pump housing, said impeller unit having a tubular neck portion, said tubular neck portion having a first and second flat surface, said first and second flat surfaces are opposite each other, said unitized system having a thrust washer with an angular corner on a rear surface and a retainer ring having a protruding torus, said unitized seal, impeller and thrust system having mating surfaces protected from contamination and damage prior to and during installation into said pump housing; and an electric motor, said motor having a drive shaft with a first and second flat surface, said motor shaft slidingly engages with said flat surfaces of said impeller unit.

27. A unitized water pump seal comprising:

an impeller unit having a tubular neck portion, said neck portion having at least one flat surface;

a seal head assembly attached to said impeller unit;

a seal seat assembly mating with said seal head assembly;

a retainer ring secured in said recess to assemble said seal head assembly and said seal seat assembly on said neck portion and facilitate leak testing of said unitized impeller, seal head assembly, and seal seat assembly prior to final assembly in an application, said retainer ring having a torus portion; and a thrust washer engaging said seal head assembly, said thrust washer having a conforming corner to interact with said torus portion on said retainer.

28. A seal as claimed in claim 27 wherein said corner is beveled to form a ball and socket joint with said torus.

29. A seal as claimed in claim 27 further comprising:

a motor attached to said neck portion, said motor having a shaft with a flat portion that engages said at least one flat surface of said neck portion.

30. A seal claimed in claim 29 wherein said recess has at least one flat surface to engage said retainer ring.

* * * * *

UNITED STATES PATENT AND TRADEMARK OFFICE
CERTIFICATE OF CORRECTION

PATENT NO.    : 6,062,815
DATED         : May 16, 2000
INVENTOR(S)   : Holt et al.

It is certified that error appears in the above-identified patent and that said Letters Patent is hereby corrected as shown below:

Column 5,
Line 39, please delete "40" and insert -- 40 -- after "system"

Column 7,
Line 40, please delete "comer" and insert -- corner --

Signed and Sealed this

Twenty-fifth Day of March, 2003

JAMES E. ROGAN
*Director of the United States Patent and Trademark Office*